United States Patent Office 3,376,346
Patented Apr. 2, 1968

3,376,346
BORON-CONTAINING COMPOUNDS AND
METHOD FOR MAKING THE SAME
Nelson N. Schwartz, East Trenton, and Marvin M. Fein, Westfield, N.J., assignors to Thiokol Chemical Corporation, Bristol, Pa., a corporation of Delaware
No Drawing. Filed Dec. 1, 1964, Ser. No. 415,167
5 Claims. (Cl. 260—606.5)

ABSTRACT OF THE DISCLOSURE

Polycarboranyl compounds of the formula

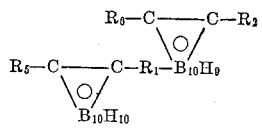

where $R_1$ is a saturated hydrocarbon and $R_2$, $R_5$, and $R_6$ are each hydrogen or alkyl. The compounds are prepared by reacting a haloalkylcarborane

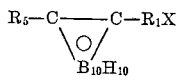

where X is halogen, with a carborane

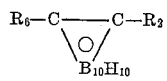

The present invention relates to novel compounds containing boron and to methods for making the same.

In recent years, there has been considerable interest in boron-containing compounds. The high heat-resistance of boron-containing liquid compounds makes them useful as heat-transfer agents, brake fluids, and plasticizers for boron-containing polymers. The compounds of the instant invention are also useful as intermediates for the preparation of a variety of novel products.

The polycarboranyl products of the present invention are reaction products of carborane or an alkylcarborane with a haloalkylcarborane and are of the formula

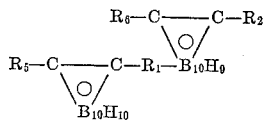

where $R_2$, $R_5$, and $R_6$ are chosen from the group consisting of alkyl radicals and hydrogen. $R_1$ is a saturated hydrocarbon group having at least 2 carbon atoms and preferably not more than 6 carbon atoms. $R_2$ is preferably a hydrogen atom or lower alkyl group having from 1 to 6 carbon atoms. $R_5$ and $R_6$ are preferably hydrogen because hydrogen atoms on the carboranyl group are labile and provide reactive sites which may be exploited for further polymerization reactions and substitution reactions.

These products are formed by reacting a haloalkylcarborane with carborane or an alkyl carborane:

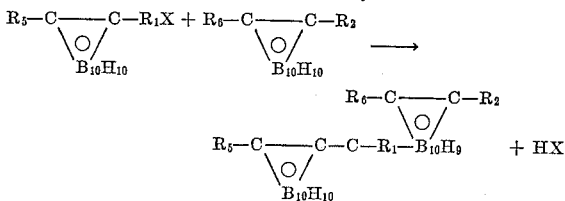

wherein $R_1$, $R_2$, $R_5$, and $R_6$ have their earlier meanings and X is a halogen atom conveniently chosen from the group consisting of chlorine, bromine, and iodine, preferably chlorine or iodine. Catalysts of the Friedel-Crafts type including protonic and Lewis acids are useful in promoting the indicating reaction. Among suitable catalysts are boron trifluoride, ferric chloride, hydrogen fluoride, and hydrofluoric acid. Preferable among such catalysts is aluminum chloride.

The preparation of alkylcarborane compounds useful in the instant process is set forth in commonly owned copending application Ser. No. 59,460, filed Sept. 29, 1960. Therein the conditions for the preparation and reaction of bis(alkylnitrilo)decarbones such as bis(acetonitrilo)decaborane with acetylenic hydrocarbon compounds are set forth in detail. Other coordination compounds besides bis(alkylnitrilo)decaboranes may be used in the preparation of carboranyl compounds including such compounds as bis(alkylsulfido)decaboranes. The preparation of these other coordination compounds is described in commonly owned and copending application Ser. No. 269,848, filed Mar. 28, 1963, now U.S. Patent 3,247,256, granted Apr. 19, 1966.

Haloalkylcarboranes may be prepared in the same manner as alkylcarboranes except that halogenated acetylenic compounds, for example propargyl chloride, are used instead of unsubstituted hydrocarbon compounds for reaction with the boron-containing coordination compounds.

The reaction proceeds suitably at room temperature. However, higher or lower temperatures may be used and it is usually convenient to operate the process at somewhat elevated temperatures, from about 50° C. to 120° C., in order to shorten the reaction time.

It will be readily understood by one skilled in the art that the above reactions may take place when the reactants are in a gaseous phase or with the use of an inert solvent medium. However, in all cases the reactants are suitably maintained in contact for a time necessary to attain optimum yields. The reaction time is not critical, and will vary with reaction temperature, concentration, etc. as is usual in chemical reactions. The product is conveniently recovered by extracting the boron-containing compounds with a suitable solvent such as methylene chloride and removing the relatively low boiling components from the solvent-extracted mixture by distillation.

When the $R_5$, $R_6$ or $R_2$ positions on the product are occupied by labile hydrogen atoms, the products of the present invention can be interreacted or reacted with other compounds to form a variety of novel products.

Alkylcarboranes containing more than one reactive halogen such as di- and tri-halo substituted materials can also be reacted with other carboranes. However, this type of product produced by such reactions will primarily be polymeric material, normally cross-linked and, although having some use as an additive to chemical propulsion systems, is of little use for further reaction and is rather difficult to handle. The reaction mechanism is the same as for the primary products of the instant process; the recovery is often complicated by the difficulty of efficiently removing the catalyst from the polymerized mass.

In order to point out more fully the nature of the present invention, the following specific example is given as an illustrative embodiment of the present process and products produced thereby.

Example

A mixture of 5.17 grams of 1-(2-chloroethyl)carborane in 30 ml. of 1-isopropylcarborane was prepared, and 5 grams of aluminum chloride was suspended therein. This suspension was heated to 80° C. and stirred at that temperature for six hours, after which the stirring was continued for 48 hours at about 20° C.

The reaction mixture was shaken with 200 ml. of 10% hydrochloric acid and extracted three times with 20 ml. portions of methylene chloride.

After removing residual moisture from the extracted material with calcium sulfate, the material was distilled at 80° C. and 5 mm. Hg absolute pressure causing the removal of the methylene chloride and the excess 1-isopropylcarborane. The remaining product was placed in a vessel which was jacketed with hot oil and distilled under 0.02 mm. Hg absolute pressure at 197° C. A very viscous, colorless liquid was obtained in the boiling range 195–197° C. at 0.02 mm. Hg absolute pressure.

Chemical analysis of the product indicated a distribution of elements which confirmed that the product was the 2-(1-carboranyl)ethyl derivative of 1-isopropylcarborane.

Percent calculated: C, 30.30; H, 9.05; B, 60.66. Percent found: C, 30.54; H, 8.99; B, 60.92.

It is of course to be understood that the foregoing example is intended to be illustrative only and that numerous changes can be made in the ingredients, proportions, and conditions set forth therein without departing from the spirit of the invention as defined in the appended claims.

What is claimed is:

1. Compounds of the formula

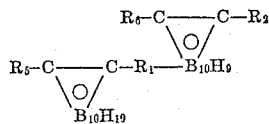

where $R_1$ is a saturated hydrocarbon group having at least 2 carbon atoms and $R_2$, $R_5$, and $R_6$ are chosen from the group consisting of hydrogen and alkyl.

2. A compound of the formula

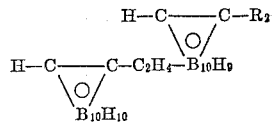

wherein $R_2$ is chosen from the group consisting of hydrogen and alkyl.

3. A 2-(1-carboranyl)ethyl derivative of 1-isopropylcarborane of the formula

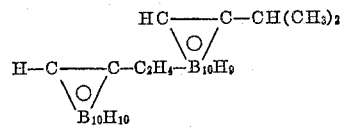

4. A process for forming polycarboranyl compounds comprising reacting a compound of the formula

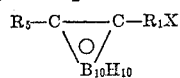

where $R_5$ is chosen from the group consisting of an alkyl group and a hydrogen, $R_1$ is a saturated hydrocarbon group of at least 2 carbon atoms and X is a halogen, with a compound of the formula

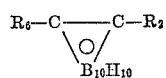

wherein $R_6$ and $R_2$ are defined as $R_5$, in the presence of a protonic catalyst.

5. A process comprising reacting 1-isopropylcarborane with 1-(2-chloroethyl)carborane in the presence of an aluminum chloride catalyst to form a compound of the formula

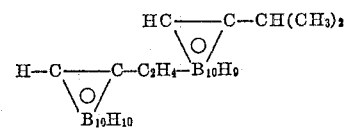

References Cited

UNITED STATES PATENTS 3,158,652  11/1964  Jordan _____ 260—606.5
3,158,653  11/1964  Stange _____ 260—606.5

TOBIAS E. LEVOW, *Primary Examiner.*

W. F. W. BELLAMY, *Assistant Examiner.*